United States Patent
Kim

(10) Patent No.: US 8,626,207 B2
(45) Date of Patent: Jan. 7, 2014

(54) METHOD OF CHECKING MODIFICATION OF TRANSMITTED MESSAGE IN MOBILE COMMUNICATION TERMINAL AND MOBILE COMMUNICATION TERMINAL PERFORMING THE SAME

(75) Inventor: Ji Yeon Kim, Geongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 1489 days.

(21) Appl. No.: 11/856,553

(22) Filed: Sep. 17, 2007

(65) Prior Publication Data

US 2008/0076457 A1     Mar. 27, 2008

(30) Foreign Application Priority Data

Sep. 27, 2006 (KR) .................. 10-2006-0094143

(51) Int. Cl.
    *H04W 4/00*      (2009.01)
    *H04M 1/725*      (2006.01)
    *G06F 15/16*      (2006.01)

(52) U.S. Cl.
    USPC ......... 455/466; 455/461; 455/412.2; 709/206

(58) Field of Classification Search
    None
    See application file for complete search history.

(56) References Cited

U.S. PATENT DOCUMENTS

| | | | | |
|---|---|---|---|---|
| 6,097,935 A | * | 8/2000 | Takahashi et al. | 455/186.1 |
| 7,630,705 B2 | * | 12/2009 | Galicia et al. | 455/414.1 |
| 2002/0132608 A1 | * | 9/2002 | Shinohara | 455/412 |
| 2002/0144154 A1 | * | 10/2002 | Tomkow | 713/201 |
| 2003/0040325 A1 | * | 2/2003 | Clark | 455/461 |
| 2004/0057403 A1 | * | 3/2004 | Jerbi et al. | 370/329 |
| 2005/0261031 A1 | * | 11/2005 | Seo et al. | 455/566 |
| 2006/0020669 A1 | * | 1/2006 | Pihlajamaki et al. | 709/206 |
| 2007/0208810 A1 | * | 9/2007 | Mostafa | 709/206 |
| 2007/0213077 A1 | * | 9/2007 | Mian et al. | 455/466 |

FOREIGN PATENT DOCUMENTS

| | | |
|---|---|---|
| JP | 2006-085331 | 3/2006 |
| KR | 10-2005-0053233 | 6/2005 |
| KR | 10-2006-0057080 | 5/2006 |
| WO | 2004-006596 | 1/2004 |

* cited by examiner

*Primary Examiner* — Jinsong Hu
*Assistant Examiner* — William Nealon
(74) *Attorney, Agent, or Firm* — Lee, Hong, Degerman, Kang & Waimey

(57) ABSTRACT

A method of checking for modification of a message transmitted by a transmitting mobile terminal comprises transmitting an original message to a receiving mobile terminal, receiving a report message comprising information about any modification of the original message, and displaying information about the modification of the original message.

18 Claims, 5 Drawing Sheets

METHOD OF CHECKING MODIFICATION OF TRANSMITTED MESSAGE IN MOBILE COMMUNICATION TERMINAL AND MOBILE COMMUNICATION TERMINAL PERFORMING THE SAME

CROSS REFERENCE TO RELATED APPLICATIONS

Pursuant to 35 U.S.C. §119(a), this application claims the benefit of earlier filing date and right of priority to Korean Application No. 10-4006-0094143, filed on Sep. 27, 2006, the contents of which are hereby incorporated by reference herein in their entirety.

FIELD OF THE INVENTION

The present invention relates to a method of checking modification of a transmitted message in a mobile communication terminal and a mobile communication terminal performing the same.

DISCUSSION OF THE RELATED ART

A multimedia message service (MMS) is a messaging technology for mobile networks allowing transmitting and receiving of multimedia information by processing, converting, and selecting data in various formats, making the data suitable for various multimedia service environments.

When a user of a transmitting mobile communication terminal prepares and transmits a multimedia message according to an Open Mobile Alliance (OMA) specification, the transmitted multimedia message is transmitted to a receiving mobile communication terminal through a Multimedia Message Service Center (MMSC).

When the multimedia message arrives at a receiving mobile communication terminal, the MMSC generates a delivery report and transmits the delivery report to the transmitting mobile communication terminal.

From the delivery report the conventional transmitting mobile communication terminal could only check whether a multimedia message was transmitted to the receiving mobile communication terminal, whether the receiving mobile communication terminal received the multimedia message or would receive the multimedia message later.

However, data included in the transmitted multimedia message may be deformed by the MMSC, and thus, the receiving mobile communication terminal may receive a multimedia message comprising deformed data.

Even in this case, the delivery report will report that the data were delivered normally to the receiving mobile communication terminal, and thus, the user of the transmitting mobile communication terminal would believe that the transmitted multimedia message has been delivered properly.

SUMMARY OF THE INVENTION

Features and advantages of the present invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the invention, a method of checking for modification of a message transmitted by a transmitting mobile terminal comprises transmitting an original message to a receiving mobile terminal, receiving a report message comprising information about any modification of the original message, and displaying information about the modification of the original message.

In another aspect of the invention, the method further comprises transmitting the original message to the receiving mobile terminal via a message server. Preferably, the original message comprises a multimedia message and the report message is received from a multimedia message service center (MMSC). Also preferably, the report message comprises a delivery report or a read report, and the delivery report or the read report further comprises an adaptation field to report detailed information about the modification of the original message.

In a further aspect of the invention, the displayed information comprises at least one of a size modification of the original message, a resolution modification of an image file included in the original message, a quality modification of a sound file included in the original message, a type or number modification of a media file included in the original message, and presence of a media form that is not supported by the receiving mobile terminal.

In a further aspect of the invention, the method further comprises receiving a notification message at the transmitting mobile terminal notifying arrival of the original message transmitted from the transmitting mobile terminal at the receiving mobile terminal. Preferably, the notification message is received from a short message service center (SMSC).

In another aspect of the invention, the method further comprises determining the modification by comparing a message transmitted to the receiving mobile terminal, and which is based upon the original message, and the original message.

In accordance with another embodiment of the invention, a mobile terminal comprises a wireless transceiver for transmitting an original message to a receiving mobile terminal and receiving a report message comprising information about any modification of the original message, a controller for obtaining information about the modification of the original message from the report message, and a display for displaying information about the modification of the original message. Preferably, the original message is transmitted to the receiving mobile terminal via message server, the original message comprises a multimedia message, and the report message is received from a multimedia message service center (MMSC). Also preferably, the report message comprises a delivery report or a read report, and the delivery report or the read report further comprises an adaptation field to report detailed information about the modification of the original message.

In another aspect of the invention, in the mobile terminal, the information about the modification of the original message comprises at least one of a size modification of the original message, a resolution modification of an image file included in the original message, a quality modification of a sound file included in the original message, a type or number modification of a media file included in the original message, and presence of a media form that is not supported by the receiving mobile terminal.

In a further aspect of the invention, the mobile terminal further comprises a wireless transceiver for receiving a notification message notifying arrival of the original message transmitted from the transmitting mobile terminal at the receiving mobile terminal. Preferably, the notification message is transmitted via a short message service center (SMSC), and the modification is determined by the server by comparing a message transmitted to the receiving mobile terminal, and which is based upon the original message, and the original message.

It is to be understood that both the foregoing general description and the following detailed description of the present invention are exemplary and explanatory and are intended to provide further explanation of the invention as claimed.

BRIEF DESCRIPTION OF THE DRAWINGS

Embodiments of the present invention are herein described in detail with reference to the following drawings in which like numerals refer to like elements.

The above and other aspects, features, and advantages of the present invention will become more apparent upon consideration of the following description of preferred embodiments, taken in conjunction with the accompanying drawing figures, wherein.

DETAILED DESCRIPTION

In the following detailed description, reference is made to the accompanying drawing figures which form a part hereof and which show by way of illustration specific embodiments of the invention. It is to be understood by those of ordinary skill in this technological field that other embodiments may be utilized, and structural, electrical, as well as procedural changes may be made without departing from the scope of the present invention wherever possible, the same reference numbers will be used throughout the drawings to refer to the same or similar parts.

Figure 1:
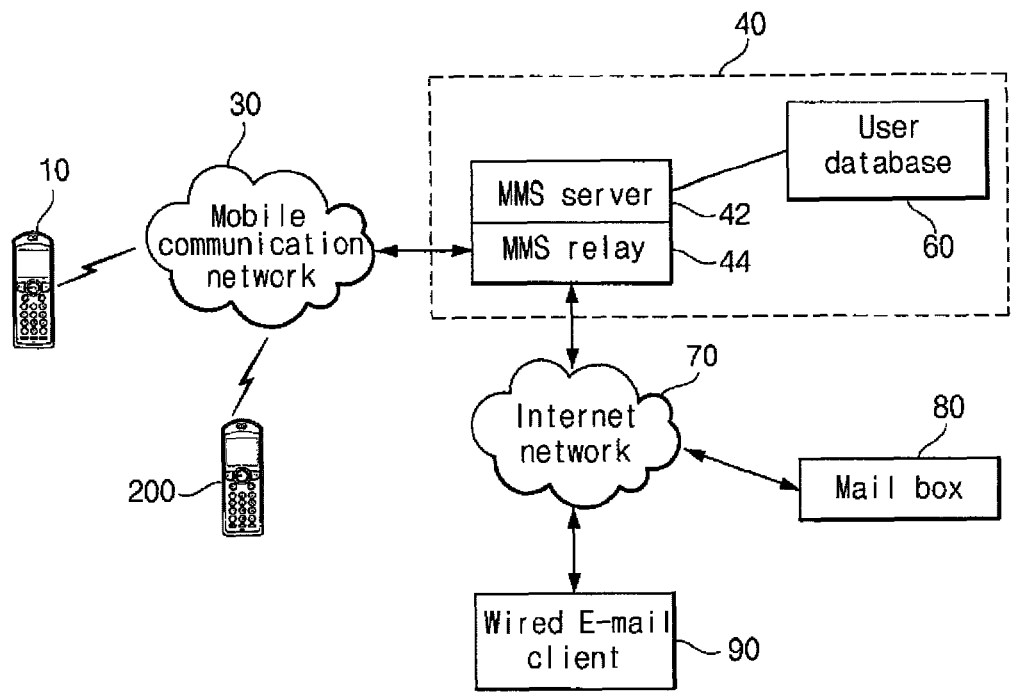
FIG. 1 is a block diagram illustrating a multimedia message service system in accordance with an embodiment of the present invention.

FIG. 1 is a block diagram illustrating a multimedia message service system in accordance with an embodiment of the present invention.

Referring to FIG. 1, the present system comprises a transmitting mobile communication terminal 200, a receiving mobile communication terminal 10, and a mobile communication network 30 for connecting the transmitting mobile communication terminal 200 and the receiving mobile communication terminal 10 to an MMSC 40.

The mobile communication network 30 may be a Global System for Mobile communication (GSM) network, a Universal Mobile Telecommunications System (UMTS) network, or a General Packet Radio Service (GPRS) network, and the like.

The multimedia message system comprises an external server such as a mail box 80 and an Internet network 70 connected to a wired E-mail client 90. The mail box 80 is connected to the Internet network 70 to store a message. The wired E-mail client 90 is connected to the Internet network 70 to transmit a wired E-mail.

The MMSC 40 comprises an MMS server 42, an MMS relay 44, and a user database 60. The MMS server 42 processes and stores transmitted and received MMS messages. The MMS relay 44 performs message transmission between different message systems. The user database 60 stores User Agent (UA) profile information. The UA profile information comprises application profile information of a mobile communication terminal subscribing to the multimedia message service (MMS).

Figure 2:
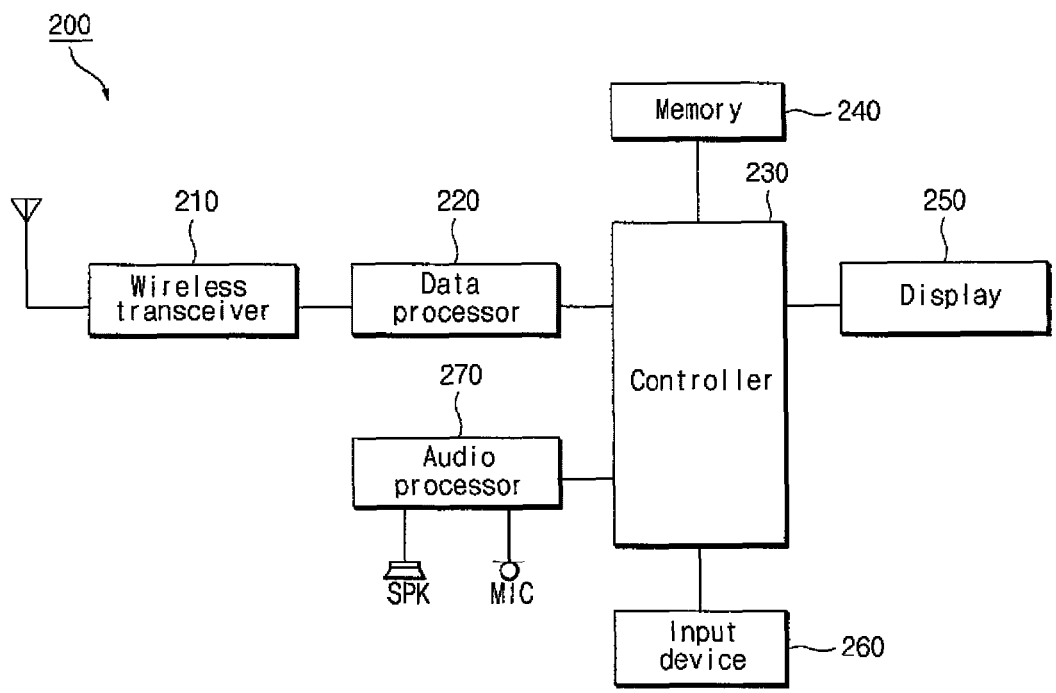
FIG. 2 is a block diagram illustrating a mobile communication terminal in an implementation of the present invention.

FIG. 2 is a block diagram illustrating a mobile communication terminal in an implementation of the present invention.

Referring to FIG. 2, the mobile communication terminal 200 comprises a wireless transceiver 210, a data processor 220, a controller 230, a memory 240, a display 250, an input device 260, and an audio processor 270.

The wireless transceiver 210 performs communication operations of the mobile communication terminal 200. In this implementation, the wireless transceiver 210 transmits a multimedia message prepared by a user to the MMSC 40, and receives a delivery report from the MMSC 40.

The data processor 220 acquires detailed information about any modification of the transmitted message by parsing the delivery report received from the MMSC 40. The data processor 220 provides this information to the controller 230.

The controller 230 controls the overall mobile communication terminal 200 and may comprise the data processor 220. In an implementation of the present invention, the controller 230 controls the wireless transceiver 210 so that the prepared message may be transmitted to the receiving mobile communication terminal 10.

When the controller 230 receives detailed information about the modification of the transmitted message from the data processor 220, the controller 230 displays detailed information on the display 250 so that the user may know detailed information about the modification of the transmitted message.

The memory 240 comprises program memory and data memory. In the program memory, programs for controlling general operation of the mobile communication terminal 200 are stored.

In an implementation of the present invention, the memory 240 stores a software program for performing a short message service (SMS) and a multimedia message service (MMS). The memory 240 stores detailed information about a data value, which is encoded in a bit or character string form, in each field of a delivery report received from the MMSC 40.

The display 250 outputs various display information and various menu screens from the transmitting mobile communication terminal 200 and comprises a Liquid Crystal Display (LCD) or an Organic Light Emitting Diode (OLED). The display 250 may comprise at least two displays comprising an external display and an internal display.

In an implementation of the present invention, the display 250 displays a multimedia message under the control of the controller 230. When a user of the transmitting mobile communication terminal 200 requests forwarding of a message and the message to be forwarded comprises a modified/converted file, the display 250 displays in a pop-up window that the requested message to be forwarded is different from the original message.

The input device 260 comprises buttons including various keys for inputting alphanumeric characters and buttons for setting various functions. The input device 260 can also be embodied with a keypad comprising a direction key, a jog dial, a touch screen, or joy stick, etc. In an implementation of the present invention, the input device 260 receives a request for transmitting a prepared multimedia message from the user and transmits the message to the controller 230.

The audio processor 270 reproduces a decoded audio signal and output generated by the data processor 220 through a speaker (SPK) and transmits an audio signal generated from a microphone (MIC) to the data processor 220.

Figure 3:
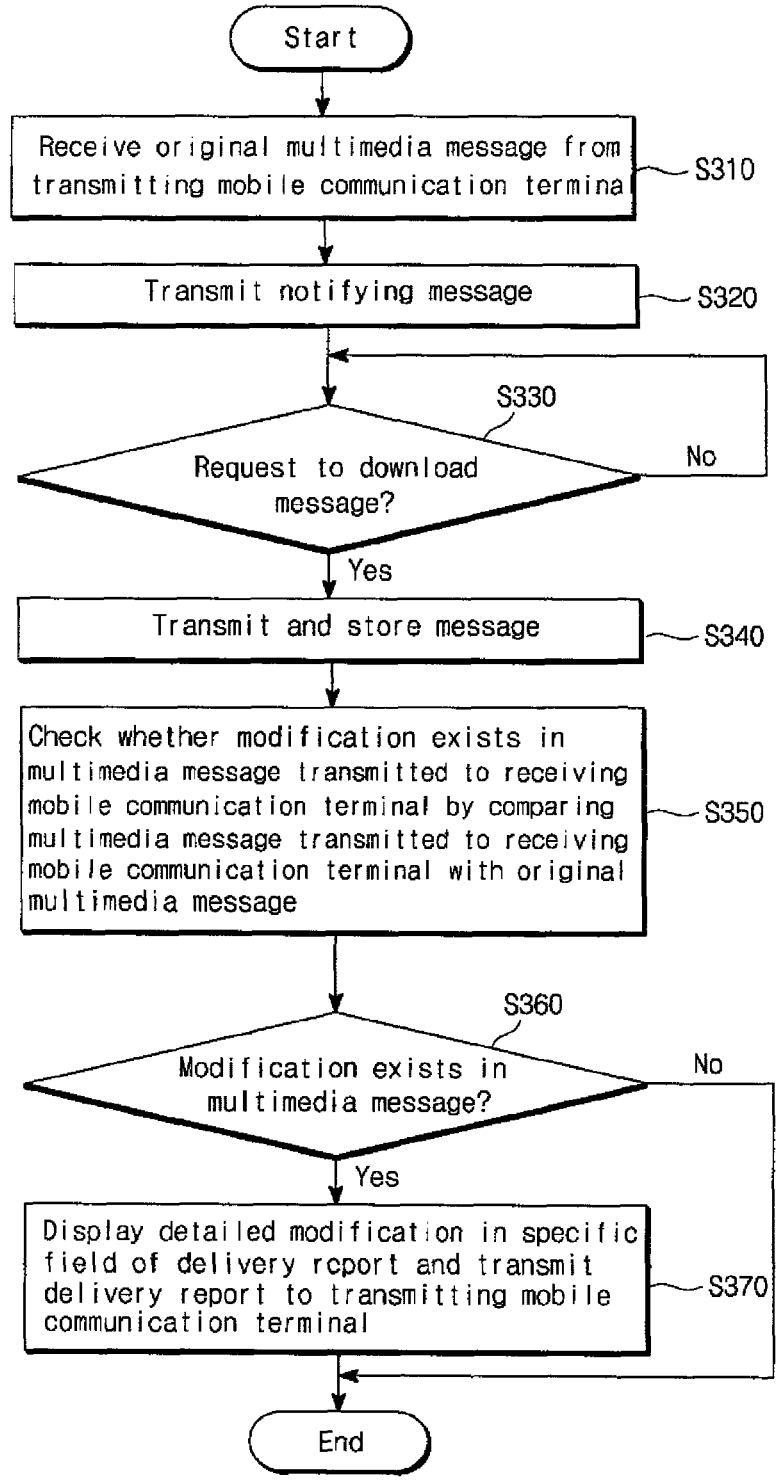
FIG. 3 is a flowchart illustrating operations performed by an MMSC in accordance with an embodiment of the present invention.

FIG. 3 is a flowchart illustrating an operation process of an MMSC in accordance with an embodiment of the present invention.

Referring to FIG. 3, when a multimedia message from the transmitting mobile communication terminal 200 is received (S310), the MMSC 40 transmits a response message to the transmitting mobile communication terminal 200 and transmits an M-notification.ind message, which is a notification message notifying that the multimedia message has arrived at the receiving mobile communication terminal 10 (S320). The notification message is transmitted to the receiving mobile communication terminal 10 via a Short Message Service Center (SMSC) (not shown) in a text form.

If the receiving mobile communication terminal 10 does not request downloading of the message after receiving the notification message (S330, No), the control flows back to S330. If the receiving mobile communication terminal 10 receives the notification message and requests downloading of the message by transmitting a WSP/HTTP GET.req message, (S330; Yes), the MMSC 40 generates a M-retrieve.conf message, transmits the M-retrieve.conf message to the receiving mobile communication terminal 10, and stores the M-retrieve.conf message (S340).

The MMSC 40 checks whether the multimedia message transmitted to the receiving mobile communication terminal 10 has been modified by comparing the multimedia message transmitted to the receiving mobile communication terminal 10 with the original multimedia message received from the transmitting mobile communication terminal 200 (S350).

If no modification exists (S360:No), control flows to the end of this figure. If any modification exists between the multimedia message transmitted to the receiving mobile communication terminal 10 and the original multimedia message received from the transmitting mobile communication terminal 200 (S360:Yes), the MMSC 40 generates a delivery report comprising detailed information about the modification and transmits the generated delivery report to the transmitting mobile communication terminal 200 (S370).

In one implementation, an adaptation field, which is a new field, is newly added to the delivery report in order to report detailed information about the modification of the message transmitted to the receiving mobile communication terminal 10.

In this implementation, the detailed information about the modification indicates whether a size of a message, resolution of an image file, a quality of a sound file, or the number and type of a media file, and the like, have been modified.

Figure 4:
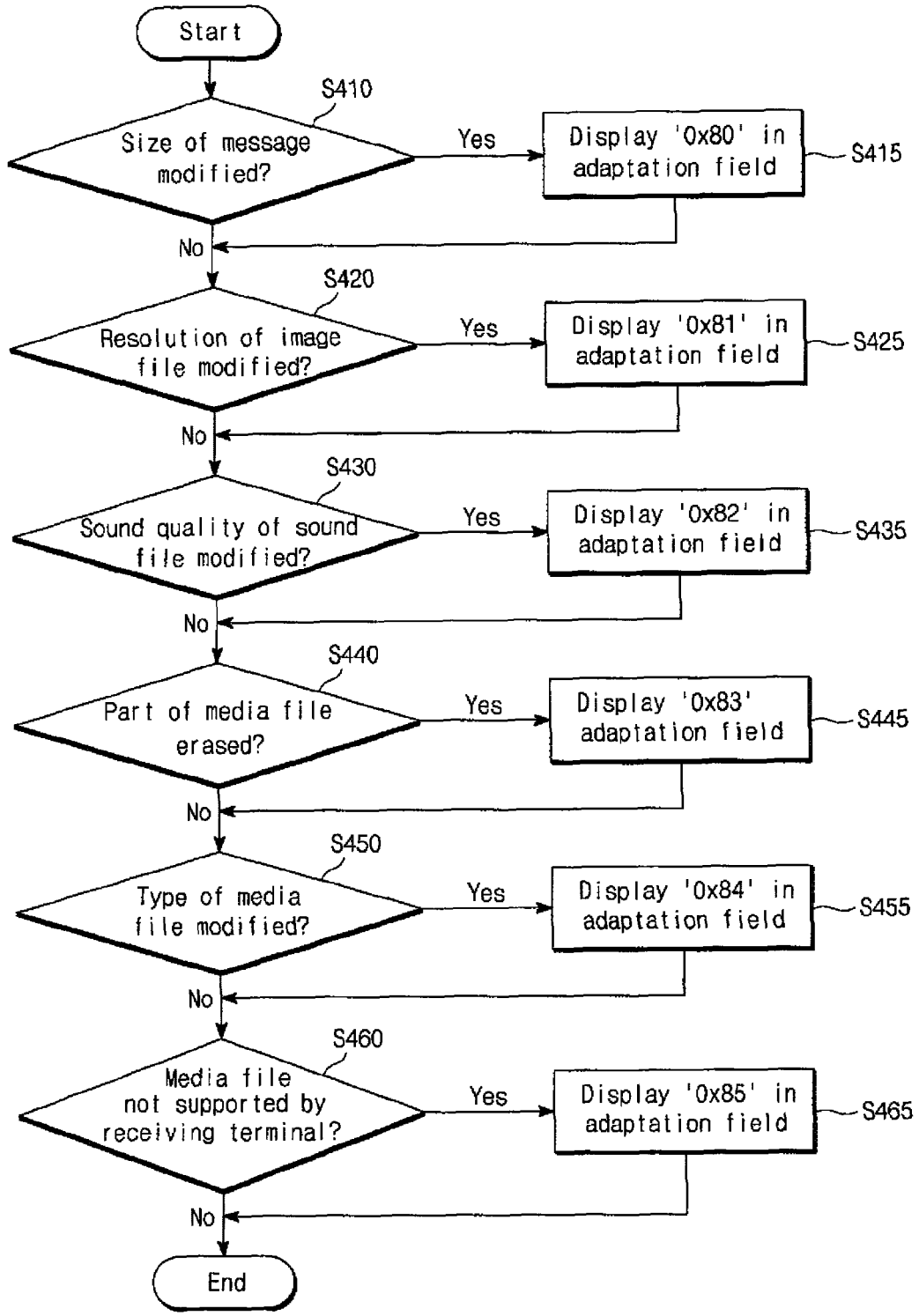
FIG. 4 is a flowchart illustrating step S370 of FIG. 3 in more detail.

FIG. 4 is a flowchart illustrating step S370 of FIG. 3 in more detail.

Referring to FIG. 4, if the size of the multimedia message transmitted to the receiving mobile communication terminal 10 has been modified compared to the size of the original multimedia message (S410:Yes), the MMSC 40 records '0x80' as a field value of an 'adaptation' field in order to notify the transmitting mobile communication terminal 200 that the size of the message transmitted to the receiving mobile communication terminal 10 was modified (S415).

If the resolution of an image file, which is included in the message transmitted to the receiving mobile communication terminal 10, has been modified (S420:Yes), the MMSC 40 records '0x81' as a field value of an 'adaptation' field in order to notify the transmitting mobile communication terminal 200 that the resolution of the image file included in the transmitted message was modified (S425).

If the sound quality of a sound file, which is included in the message transmitted to the receiving mobile communication terminal 10, has been modified (S430:Yes), the MMSC 40 records '0x82' as a field value of an 'adaptation' field in order to notify the transmitting mobile communication terminal 200 that the sound quality of the sound file included in the transmitted message was modified (S435).

If a part of a media file, which is included in the original multimedia message, has been erased and the media file has been transmitted to the receiving mobile communication terminal 10 (S440:Yes), the MMSC 40 records '0x83' as a field value of the 'adaptation' field in order to notify the transmitting mobile communication terminal 200 that a part of the media file included in the transmitted message was erased (S445).

If the type of media file transmitted to the receiving mobile communication terminal 10 is different from the type of media file included in the original multimedia message (S450:Yes), the MMSC 40 records '0x84' as a field value of the 'adaptation' field in order to notify the transmitting mobile communication terminal 200 that the type of the media file included in the transmitted message was modified (S455).

The MMSC 40 checks whether the media file, which is included in the message transmitted to the receiving mobile communication terminal 10, comprises a media file that is not supported by the receiving mobile communication terminal 10, by comparing the media file included in the message transmitted to the receiving mobile communication terminal 10 with UA profile information of the receiving mobile communication terminal 10 stored in the user database 60.

If the media file, which is included in the message transmitted to the receiving mobile communication terminal 10, comprises a media file that is not supported by the receiving mobile communication terminal 10 (S460:Yes), the MMSC 40 records '0x85' as a field value in the 'adaptation' field in order to notify the transmitting mobile communication terminal 200 detailed information about the unsupported media file (S465).

If a modification exists in the multimedia message transmitted to the receiving mobile communication terminal 10, the MMSC 40 records detailed information about the message modification in the 'adaptation' field, which is newly added to the delivery report, and then transmits the delivery report to the transmitting mobile communication terminal 200.

In this example, when there are at least two modifications, for example, when resolution of an image file and sound quality of a sound file have been modified, all modifications can be recorded in the 'adaptation' field.

In the implementation described above, the field value of the 'adaptation' field is prepared in a bit string of a hexadecimal form, but the field value may be alternatively expressed in a text string form.

Figure 5:
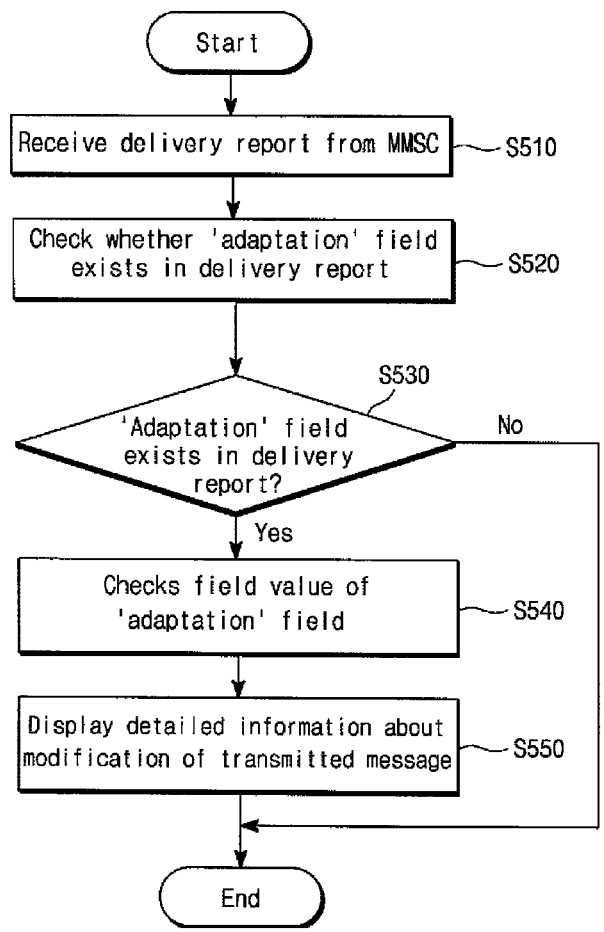
FIG. 5 is a flowchart illustrating a method of checking a modification of a transmitted message of a mobile communication terminal in an implementation of the present invention.

FIG. 5 is a flowchart illustrating a method of checking a modification of a transmitted message of a mobile communication terminal in an implementation of the present invention.

Referring to FIG. 5, the transmitting mobile communication terminal 200 transmits a multimedia message and then receives a delivery report, comprising information about whether the multimedia message was delivered normally to the receiving mobile communication terminal 10 from the MMSC 40 (S510).

When the delivery report is received by the transmitting mobile communication terminal 200, the data processor 220 of the transmitting mobile communication terminal 200 determines whether the 'adaptation' field exists in the delivery report by parsing the delivery report (S520).

If the "adaptation" field does not exist control flows to the end of this figure. If the 'adaptation' field exists in the delivery report (S530:Yes), the data processor 220 examines the field value of the 'adaptation' field (S540) and provides the controller 230 detailed information about the modification of the message in accordance with the field value parameter.

As shown in FIG. 4, when field values, which are encoded in a bit string of a hexadecimal form or in a text string form, are received, the data processor 220 decodes the field values in the 'adaptation' field and provides detailed information about the modification to the controller 230.

The detailed information about the modification comprises size modification of a message, resolution modification of an image file, sound quality modification of a sound file, presence of an erased part in a media file, file type modification in a message, or a media form that is not supported by the receiving mobile communication terminal, as described above.

If detailed information about the modification of the message is provided from the data processor 220, the controller 230 displays the detailed information about the modification of the message in the display 250 (S550).

Accordingly, the user of the transmitting mobile communication terminal 200 can check whether the message transmitted by the user was modified and the modified message was transmitted to the receiving mobile communication terminal 10, by receiving detailed information about the modification.

Figure 6:
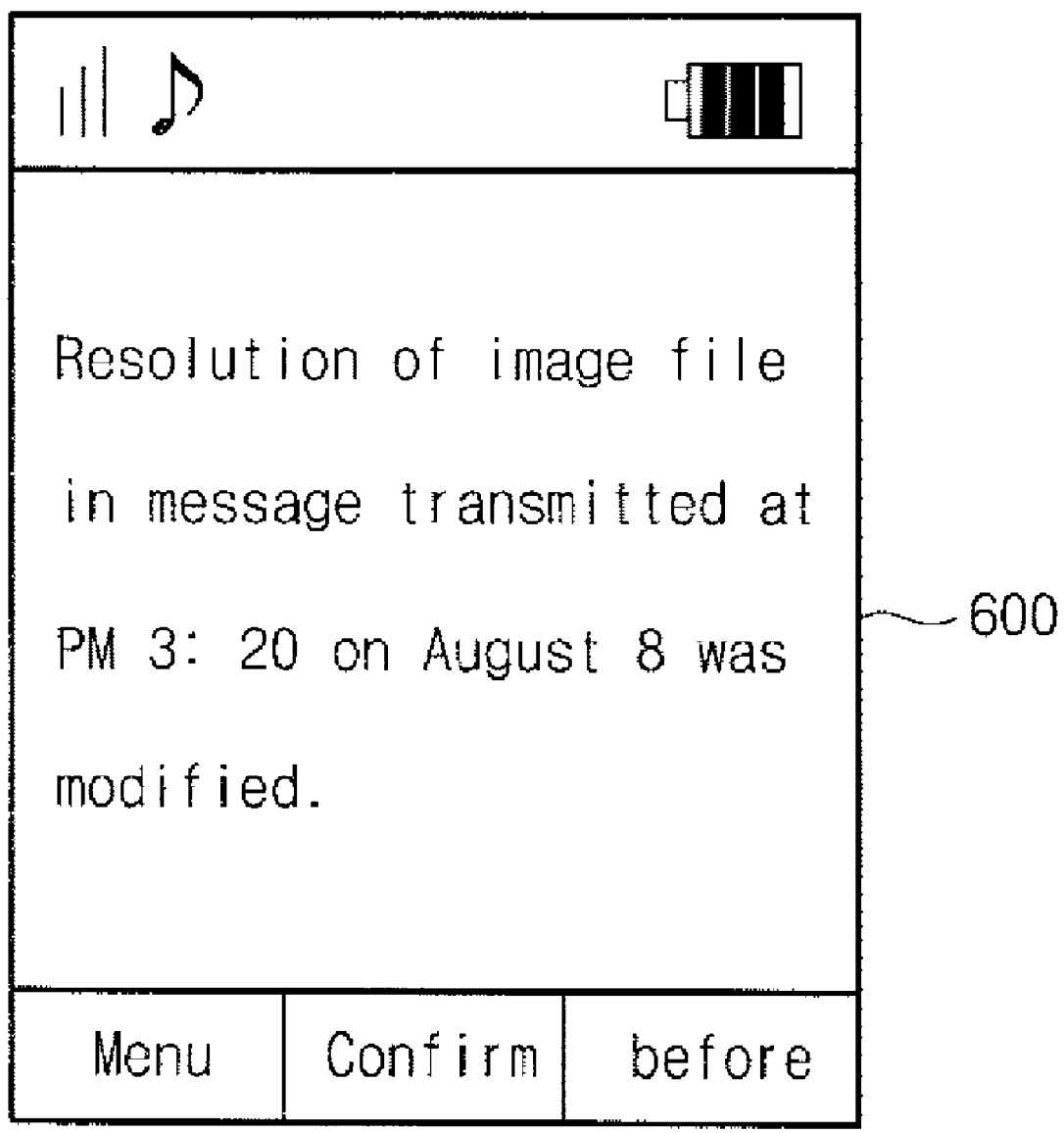
FIG. 6 illustrates an example of a display for displaying modifications of a transmitted message in an implementation of the present invention.

FIG. 6 illustrates an example of a display for displaying a modification of a transmitted message in an implementation of the present invention.

Referring to FIG. 6, the display 250 displays a screen 600 in which the modification of the transmitted message is displayed under the control of the controller 230.

In this implementation, in order to notify the user that the resolution of an image file included in the transmitted message had been modified and the image file in which the resolution had been modified was transmitted to the receiving mobile communication terminal 10, the display 250 displays a guide message "Resolution of an image file in a message transmitted at PM 3:20 on August 8 was modified." on the screen 600. The screen 600 in which the modification of the transmitted message is displayed may be displayed in a pop-up window.

In the implementation described above, although an 'adaptation' field comprising detailed information about the modification of the transmitted message is newly added to the delivery report, the present invention is not limited thereto.

The MMSC 40 may add the 'adaptation' field described above to a read report comprising information about whether the user of the receiving mobile communication terminal 10 read a message and transmit a read report to the transmitting mobile communication terminal 200. Accordingly, the transmitting mobile communication terminal 200 displays detailed information about the modification of the transmitted message to the user by checking the 'adaptation' field in the read report.

As described above, in an implementation of the present invention, when a message transmitted by the user is modified and the modified message is transmitted to the receiving mobile communication terminal, the user of the transmitting mobile communication terminal can learn detailed information about the modification of the transmitted message.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of checking for modification of a message transmitted by a transmitting mobile terminal, the method comprising:
    transmitting, by the transmitting mobile terminal, an original message to a receiving mobile terminal via a message server;
    receiving, from the message server, a first delivery report or read report when the original message has been delivered to the receiving mobile terminal without any modification to the original message, wherein the first delivery report or read report does not include an encoded adaptation field;
    receiving, from the message server, a second delivery report or read report when a modified message, which is a message modified by the message server based upon the original message, has been delivered to the receiving mobile terminal, the second delivery or read report comprising an encoded adaptation field to report information about modification of the original message;
    parsing the first delivery report or read report and second delivery report or read report;
    recognizing that the original message delivered to the receiving mobile terminal has not been modified from the original message when the encoded adaptation field is not included in the parsed first delivery report or read report;
    recognizing that the modified message delivered to the receiving mobile terminal has been modified from the original message when the encoded adaptation field is included in the parsed second delivery report or read report;
    obtaining the information about the modification of the original message by decoding at least one field value, which is encoded in a bit or character string form in the encoded adaptation field, and retrieving the information from a memory storing detailed information about various field values based on the decoded at least one field value when it is determined that the encoded adaptation field exists in the second delivery report or read report; and
    displaying the obtained information about the modification of the original message,
    wherein the original message comprises a multimedia message and the information about the modification of the original message is obtained by decoding the at least one field value in the encoded adaptation field of the received read report that comprises information about whether the modified message has been read by the receiving mobile terminal.

2. A method of claim 1, wherein the information is displayed in a pop-up window.

3. The method of claim 1, wherein the message server comprises a multimedia message service center (MMSC).

4. The method of claim 1, wherein the displayed information comprises at least:
a size modification of the original message,
a resolution modification of an image file included in the original message,
a quality modification of a sound file included in the original message,
a type or number modification of a media file included in the original message, or
presence of a media form that is not supported by the receiving mobile terminal.

5. The method of claim 1, further comprising:
receiving a notification message at the transmitting mobile terminal notifying arrival of the original message at the receiving mobile terminal.

6. The method of claim 5, wherein the notification message is received from a short message service center (SMSC).

7. The method of claim 1,
wherein the modification is determined at the message server by comparing a message, which is based upon the original message and transmitted to the receiving mobile terminal, with the original message.

8. A mobile terminal comprising:
a wireless transceiver configured to:
transmit an original message to a receiving mobile terminal via a message server;
receive a first delivery report or read report when the original message has been delivered to the receiving mobile terminal without any modification to the original message, wherein the first delivery report or read report does not include an encoded adaptation field; and
receive a second delivery report or read report comprising an encoded adaptation field to report information about modification of the original message, wherein the second delivery report or read report is received when a modified message, which is a message modified by the message server based upon the original message, has been delivered to the receiving mobile terminal;
a memory for storing detailed information about various field values;
a controller configured to:
parse the first delivery report or read report and second delivery report or read report;
recognize that the original message delivered to the receiving mobile terminal has not been modified from the original message when the encoded adaptation field is not in the parsed first delivery report;
recognize that the modified message delivered to the receiving mobile terminal has been modified from the original message based when the encoded adaptation field is included in the parsed second delivery report or read report; and
obtain the information about the modification of the original message by decoding at least one field value, which is encoded in a bit or character string form in the encoded adaptation field, and retrieving the information from a memory based on the decoded at least one field value when it is determined that the encoded adaptation field exists in the second delivery report or read report; and
a display for displaying the obtained information about the modification of the original message,
wherein the original message comprises a multimedia message and the information about the modification of the original message is obtained by decoding the at least one field value in the encoded adaptation field of the received read report that comprises information about whether the modified message has been read by the receiving mobile terminal.

9. The mobile terminal of claim 8, wherein the controller causes the display to display the information in a pop-up window.

10. The mobile terminal of claim 8, wherein the wireless transceiver is configured to receive the delivery report or read report from the message server comprising a multimedia message service center (MMSC).

11. The mobile terminal of claim 8, wherein the information about the modification of the original message comprises at least:
a size modification of the original message,
a resolution modification of an image file included in the original message,
a quality modification of a sound file included in the original message,
a type or number modification of a media file included in the original message, or
presence of a media form that is not supported by the receiving mobile terminal.

12. The mobile terminal of claim 8, wherein the wireless transceiver is configured to receive a notification message notifying arrival of the original message at the receiving mobile terminal.

13. The mobile terminal of claim 12, wherein the notification message is transmitted via a short message service center (SMSC).

14. The mobile terminal of claim 8, wherein the modification is determined by the message server comparing a message, which is based upon the original message and transmitted to the receiving mobile terminal, with the original message.

15. The method of claim 1, wherein the information about the modification of the original message is displayed in a text form.

16. The method of claim 15, wherein the original message is identified by at least a time or a date when the original message was transmitted from the transmitting mobile terminal in the displayed information.

17. The mobile terminal of claim 8, wherein the information about the modification of the original message is displayed in a text form.

18. The mobile terminal of claim 17, wherein the original message is identified by at least a time or a date when the original message was transmitted from the transmitting mobile terminal in the displayed information.

* * * * *